April 15, 1958  B. MAILLARD  2,830,498
MULTIPLE CARTRIDGE CLIP FEEDING MECHANISMS FOR AUTOMATIC GUNS
Filed Oct. 22, 1954  10 Sheets-Sheet 1

INVENTOR
BERNARD MAILLARD,
BY
Robert B Larson
ATTORNEY

April 15, 1958  B. MAILLARD  2,830,498
MULTIPLE CARTRIDGE CLIP FEEDING MECHANISMS FOR AUTOMATIC GUNS
Filed Oct. 22, 1954  10 Sheets-Sheet 8

INVENTOR
BERNARD MAILLARD,
BY
ATTORNEY

April 15, 1958   B. MAILLARD   2,830,498
MULTIPLE CARTRIDGE CLIP FEEDING MECHANISMS FOR AUTOMATIC GUNS
Filed Oct. 22, 1954   10 Sheets-Sheet 9

INVENTOR
BERNARD MAILLARD,
BY
ATTORNEY

United States Patent Office 2,830,498
Patented Apr. 15, 1958

2,830,498
MULTIPLE CARTRIDGE CLIP FEEDING MECHANISMS FOR AUTOMATIC GUNS

Bernard Maillard, Geneva, Switzerland, assignor to "Brevets Aero-Mecaniques," Geneva, Switzerland, a society of Switzerland Application October 22, 1954, Serial No. 464,143

15 Claims. (Cl. 89—33)

The present invention relates to multiple cartridge clip feeding mechanisms for automatic guns, the term "multiple cartridge clip feeding mechanism" designating any feeding mechanism for an automatic gun which comprises, On the one hand, a magazine in which are stacked upon each other several distinct and independent elements each constituted by a holder plate and a plurality of cartridges disposed side by side and carried by said plate (which elements will hereinafter be called "cartridge clips"), said magazine being provided with a window through which it is possible to fill it by introducing thereinto new clips provided with their cartridges, And, on the other hand, a mechanism for passing the cartridge clip which is the first to be fired along a stripping or extractor device capable of successively catching the cartridges of this clip and introducing them into the gun, the holder plate of said cartridge clip, once it has been stripped from its cartridges, being replaced by the next cartridge clip which then becomes the first cartridge clip to be fired.

The object of my invention is to provide a feeding mechanism of this type which is better adapted to meet the requirements of practice, and in particular which is suitable for feeding ammunition to automatic guns having a high rate of fire.

Some embodiments of such a feeding mechanism will now be described with reference to the appended drawings in which.

The feeding mechanism which is to be described is intended for an automatic gun of small caliber, that is to say a caliber ranging from 20 mm. to 75 mm. for instance.

Figure 1:
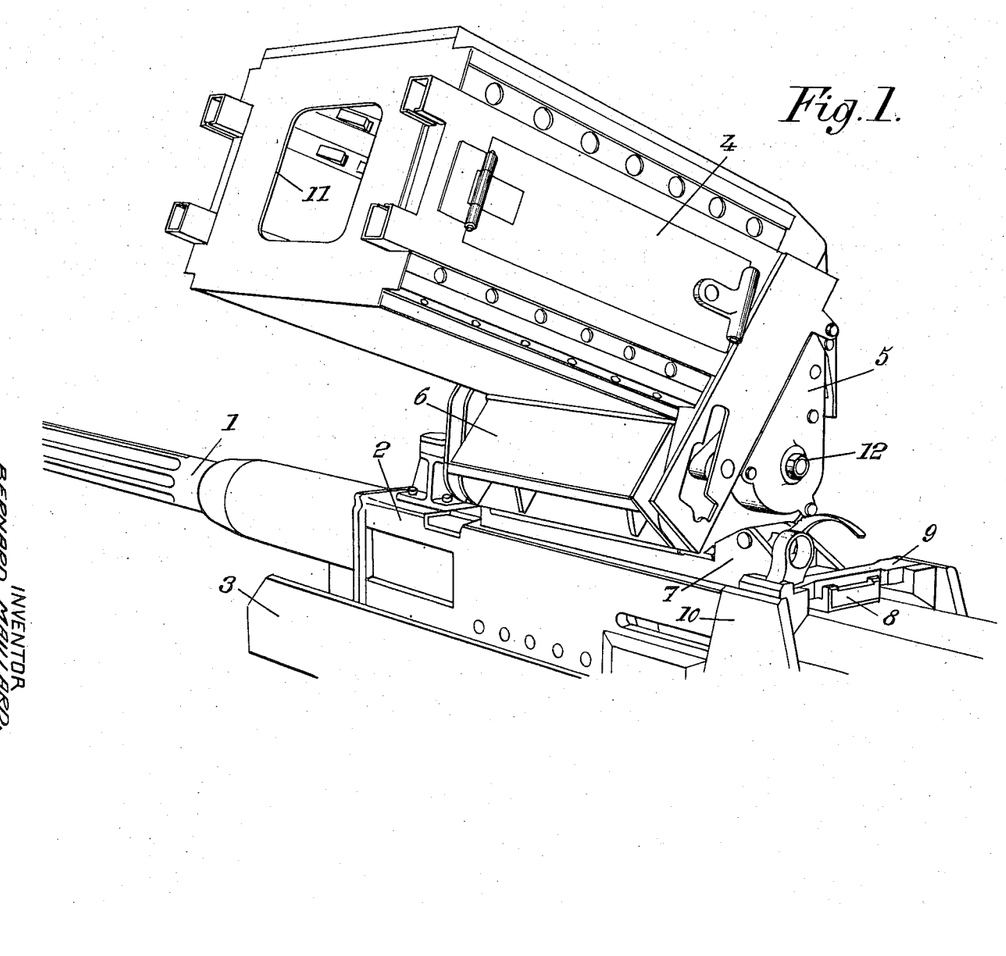
Fig. 1 is a perspective view of a multiple cartridge clip feeding mechanism made according to the present invention.

It will be supposed, by way of example, that the automatic gun to be fed with ammunition includes, as shown by Fig. 1, a barrel 1 rigid at the rear thereof with a breech-casing 2, the whole being mounted slidable in a fixed support 3 with the interposition of buffer means (not shown).

It will also be supposed, still by way of example, that the gun is of a type in which the introduction of the cartridges thereinto takes place through an aperture provided in the upper face of breech-casing 2.

My multiple cartridge clip feeding mechanism for such a gun includes, in a known fashion, On the one hand, a magazine 4 in which are stacked a plurality of cartridge clips $D_1$, $D_2$, etc., And, on the other hand, a mechanism for passing the first cartridge clip $D_1$ that is to be fired through a stripping device capable of successively stripping from said clip the cartridges it includes so as to introduce them into breech-casing 2, said device being housed in a casing 5 which is detachably fixed in magazine 4.

The casing of magazine 4 is of a general shape corresponding to that of the stack of cartridge clips $D_1$, $D_2$, etc.

In particular, if the plates of said cartridge clips have, as it will be hereinafter supposed, a rectangular outline, the casing of magazine 4 is given the general shape of a parallelepipedal box, and this casing carries, near the end thereof where is located the first cartridge clip $D_1$ to be fired, a side passage 6 for guiding said clip $D_1$ when it is moved transversely away from the stack of cartridge clips so as to pass through the cartridge stripping device, after which the holder plate of said clip is ejected.

Therefore, seen from the outside, the whole of the feeding mechanism is constituted by a parallelepipedal block 4 upon the bottom of which is fixed the casing of stripping device 5, passage 6 forming a lateral projection at the lower end of said block.

I will now explain how my feeding mechanism is mounted on the gun.

Preferably, the whole of this mechanism does not participate in the recoil movement of the gun with respect to support 3. For this purpose, advantageously, said mechanism is mounted in a detachable manner on a magazine carrier 7 slidable on the upper wall of breech casing 2 and fixed to support 3. As shown by Fig. 1, carrier 7 is fixed on support 3 by means of a rear arm 8 secured to a cross member 9 supported by two brackets 10 rigid with support 3.

Thus, the feeding mechanism is located above the gun and preferably, as shown by Fig. 1, magazine 4 is offset laterally with respect to the gun and is inclined to the vertical so that guiding passage 6 is sloping downwardly.

Furthermore, advantageously, the plates of the cartridge clips in the magazine are not disposed exactly in such manner that their planes are at right angles both to the front and rear walls of the magazine and to the right and left side walls thereof.

Thus, if the side walls of the magazine are, as above stated, not vertical but are steeply inclined with respect to the vertical plane passing through the axis of the gun, the planes of the clip plates, while being at right angles to the front and rear walls of the magazine, make a small angle with the right and left side walls of said magazine, so that these planes make, with said vertical plane of the axis of the gun, an angle greater than if said plates were at right angles to the side walls of the magazine. It will be understood that with such an arangement, despite the great inclination of the magazine, it is easier to insert the cartridge clips into the magazine, and said clips are more likely to be correctly superimposed to one another than if their direction was close to the vertical.

The filling window of magazine 4 is located in the upper side wall of said magazine (that is to say the right hand side wall on the drawings), this window being preferably dimensioned so as to extend over the whole face of said side wall whereby it is possible to introduce fresh cartridge clips into the magazine whatever be the degree of filling thereof.

Advantageously, the top end plate of the magazine is provided with an opening 11 (Fig. 1) through which it is possible to pass the arm in order to press down the last cartridge clip inserted in the magazine, so as to apply it closely upon the preceding clip.

Anyway, the weight of the cartridge clips facilitates their introduction into magazine 4 and also their downward movements through said magazine and their displacement through passage 6, the lateral ejection of the empty plates of said clips being also facilitated by the action of gravity.

On the other hand, the lateral location of magazine 4 on one side of the gun has the advantage of leaving the other side clear for observation of a target by the gunner.

I will now explain how the first cartridge clip to be fired, to wit $D_1$, is moved through passage 6, after which I will explain how the other clips, to wit $D_2$, $D_3$, etc., are fed downward through magazine 4 once the cartridges of clip $D_1$ have been fired.

The movement of cartridge clip $D_1$ through passage 6 is obtained by means of a device including rotor means actuated by the recoil of the gun.

Figure 2:
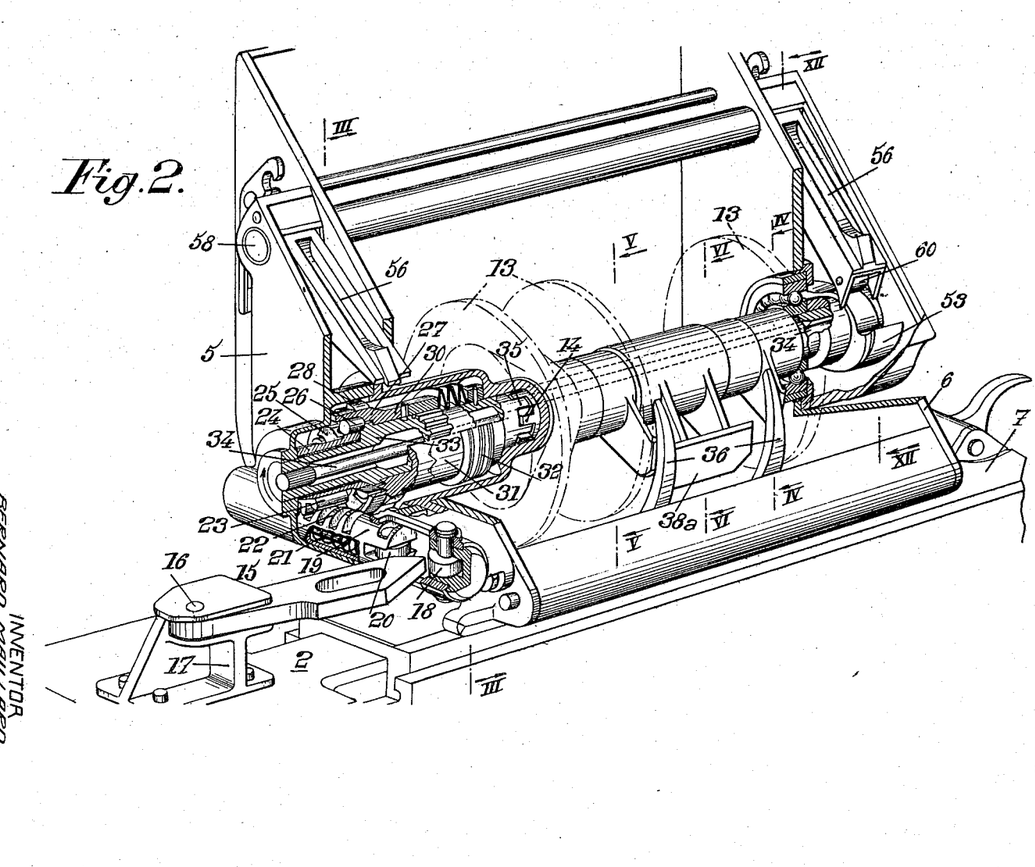
Fig. 2 is a perspective view, with parts cut away, of a rotor mechanism belonging to said feeding mechanism, a modification of this mechanism being shown by Fig. 2 bis.

As it will be more explicitly described hereinafter, every cartridge clip has an open face turned toward the gun. The rotor device therefore includes, as shown by Fig. 2, toothed wheels 13 capable of engaging successively all the cartridges of the clip substantially in the way in which a pinion engages the teeth of a rack. In the example illustrated by the drawing, there are three such wheels 13, and on Fig. 2 they are diagrammatically shown by a double circle in dotted lines.

Preferably, wheels 13 are carried by a tubular shaft 14 the rear end 12 of which is in the form of a bolt having six faces and the front end of which is actuated by the recoiling portion of the gun, with the interposition of an energy accumulator device capable of being tensioned every time a shot is fired by said recoiling portion.

Figures 3, 4, 5, 6:
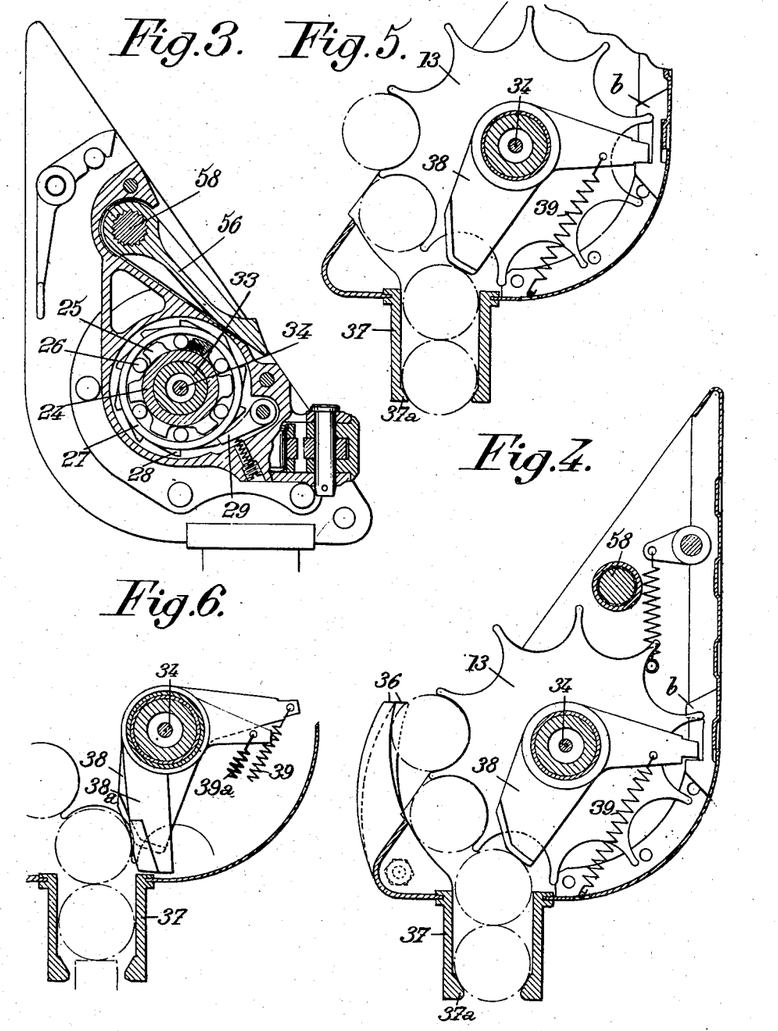
Figs. 3 to 6 inclusive are cross sections on the respective lines III—III, IV—IV, V—V and VI—VI of Fig. 2.

Such an arrangement is more especially illustrated by Figs. 2 and 3.

The breech-casing 2 of the gun carries a cam 15 mounted to oscillate about a pin 16 at right angles to the upper face of said breech-casing on a support 17 fixed on said upper face.

This cam 15 is arranged and disposed in such manner that when the gun is recoiling, said cam is engaged in wedge-like fashion between a fixed abutment constituted by a roller 18 and a push-piece 19 provided with a roller 20 and slidable transversely against the action of a return spring 21. Said roller 18 and said push-piece 19 are housed in the front portion of casing 5 which, as above stated, remains stationary during the recoil movement of the gun.

Push-piece 19 carries a rack 22 adapted to mesh with a toothed sector 23 rigid with a tubular sleeve 24 which carries the driving portion 25 of a free wheel (including for instance rollers 26) the driven portion 27 of which carries teeth 28 cooperating with a pawl 29 which permits movement of said driven portion only in one direction.

This driven portion 27 of the free wheel is rigid with the driving element 30 of a dog clutch the driven element 31 of which (applied against element 30 by an elastic device such for instance as a stack of flexible washers 32) is coupled in rotation, for instance by means of splines, with a hollow shaft 33 coaxial with tubular sleeve 24 and located on the inside thereof.

The free end of this hollow shaft 33 is coupled, for instance by means of splines, with one end of a torsion bar 34 the other end of which is similarly coupled in rotation with hollow tubular shaft 14, which carries toothed wheels 13.

Said shaft 14 is coupled with the facing end of hollow shaft 33 through a clutch 35 including straight teeth the male and female elements of which are engaged in one another with an angular play which will be hereinafter more explicitly referred to and which, in a very satisfactory embodiment of my invention, where the rotor includes ten teeth (the pitch being then equal to 36° of rotation of the rotor) is about 30°.

It will be understood that, with such a mechanism, torsion bar 34 will be twisted, every time a shot is fired, by an amount limited by said angular play, then will expend by an angle at most equal to this pitch when a cartridge is introduced into the gun, which introduction permits a forward movement equal to one pitch of cartridge clip $D_1$.

I will now describe how the cartridges carried by clip $D_1$ are stripped therefrom and fed toward the feed passage provided in magazine carrier 7. For this purpose, according to my invention, this device for stripping the cartridges from the plates on which they are fitted includes a plurality of fixed deflectors 36, for instance two, carried by casing 5 and arranged in such manner that their end is engaged between the supporting plate of cartridge clip $D_1$ and the cartridges which are carried by said plate (see Figs. 7 and 16), whereby said deflectors strip one cartridge from the plate every time the cartridge clip is moved a distance corresponding to one pitch.

Figures 7, 8, 9, 10, 11:
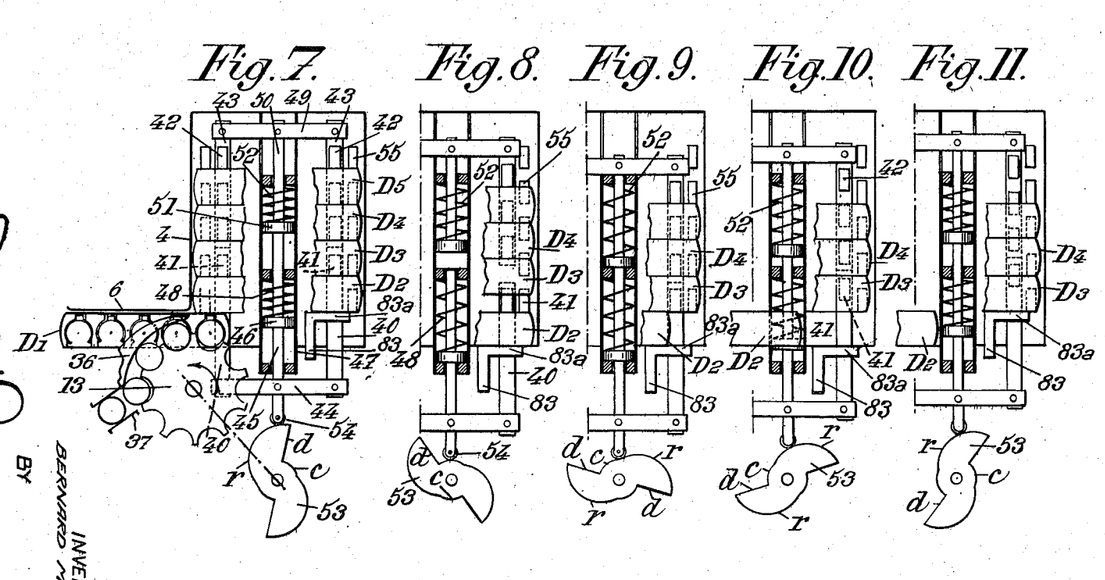
Figs. 7 to 11 inclusive are diagrammatical views illustrating the operation of a device for feeding the cartridge clips through the magazine.
Figure 16:
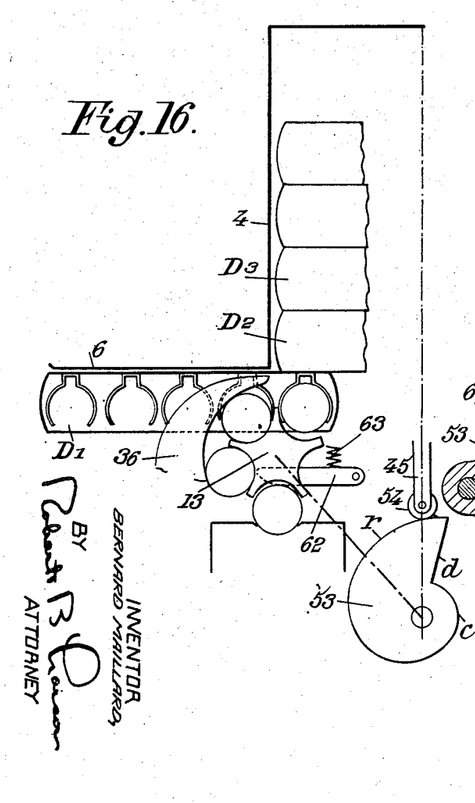
Fig. 16 is a diagrammatical view illustrating another embodiment of the feeding mechanism according to the invention.

Fixed deflectors 36 are so shaped that they keep these stripped cartridges temporarily in engagement with toothed wheels 13, said stripped cartridges being thus directed by said toothed wheels toward feed passage 37 which is provided, at its lower end, with retaining projections 37a on which the first cartridge to be introduced into the gun is resting, in waiting position.

Conventional oscillating deflectors 38 (Figs. 4 to 6) for instance two in number, similar to those commonly used in known rotor feed mechanisms, are then advantageously freely mounted on shaft 14, said oscillating deflectors being intended to push toward the projections 37a of the feed passage, under the effect of their return spring 39, and also possibly due to their being stopped against a fixed abutment b, the cartridges which must penetrate into said passage.

Advantageously, I provide at least one supplementary oscillating deflector 38a (Figs. 2 and 6) which is mounted similarly to deflectors 38 but is urged by a more powerful spring 39a and is not provided with a fixed abutment b. This deflector is brought into play when the cartridge which has just met it has already somewhat pushed back the conventional deflectors 38. The elastic braking that is thus exerted upon the cartridge by powerful spring 39a absorbs the inertia of the rotor before abutments b have to act. Thus, the shock that would take place in the absence of deflector 38a when deflectors 38 come to strike abutments b and which might deteriorate the cartridge cases, is replaced by a resilient action.

I will now describe the devices according to my invention for achieving a satisfactory displacement of the cartridge clips $D_2$, $D_3$, etc. . . ., through a magazine 4 once cartridge clip $D_1$ has been emptied and its plate ejected.

In order to obtain this result, I make use of a driving device including sliding systems provided with pawls and mounted on the side walls of said magazine, said systems being given a reciprocating motion.

Preferably, as it will be hereinafter supposed, said sliding systems are actuated during firing by driving means operated by the gun recoil energy.

Furthermore, I provide, for feeding the cartridge clips through magazine 4, two distinct and independent driving mechanisms, to wit, on the one hand a quick acting mechanism capable, when cartridge clip $D_1$ has been stripped of all its cartridges, of quickly feeding the next cartridge clip $D_2$ into firing position, and, on the other hand, a mechanism adapted to work at a slower rate for feeding toward clip $D_2$ already in firing position, the whole of the stack of clips $D_3$, $D_4$, etc., in the magazine.

It is therefore advisable to constitute these distinct and independent driving mechanisms by sliding systems provided with pawls.

Figs. 7 to 11 diagrammatically show the essential elements of two mechanisms of this kind intended to move the cartridge clips through magazine 4, these figures showing the parts in different positions corresponding to successive steps of the operation of said mechanisms.

The mechanisms intended to impart a quick downward movement to cartridge clip $D_2$ along the walls of magazine 4 are located respectively on the side of the points of the shells and on the side of the rear bases of the cartridges and they include two sliding members 40 each provided with a pawl 41 arranged so as to engage a corresponding abutment rigid with the cartridge clip in question.

The mechanism intended to achieve a slower displacement of the other cartridge clips present in magazine 4 is constituted by providing, on each of said walls of the magazine, two rows of pawls 42 disposed parallel to the direction in which the clips are moving, the pawls of every row being carried by a sliding member 43.

Preferably, the same driving means serve to move the sliding members 40 and 43 located on the same side of magazine 4.

In view of the fact these two mechanisms are working independently of each other, they may both be controlled imperatively, or one of them may be controlled imperatively (in this case the one acting upon cartridge clip $D_2$), the other one being then controlled by resilient means previously placed under the tension, or again both of them can be controlled by independent resilient means, these resilient means being tensioned every time a shot is fired.

I will describe, by way of example, a construction corresponding to this last mentioned case.

According to this construction, the two sliding members 40 which carry the pawls 41 for actuating the cartridge clip $D_2$ are connected together by a lever 44 pivoted at its middle point on the rod 45 of a guide (for instance of the type constituted by a piston 46 slidable in a cylinder 47) extending parallel to said sliding members 40.

This guide is subjected to the action of a return spring 48 tending to move rod 45 and sliding members 40 in the direction which feeds cartridge clip $D_2$ toward its firing position.

In a likewise manner, the sliding members 43 which carry the pawls for actuating the other cartridge clips are connected together by a lever 49 pivoted at its middle point on a rod 50 carried by a guide constituted for instance by a piston 51 slidable in the same cylinder as piston 46. A spring 52 cooperates with said guide to urge rod 50 and sliding members 43 in the direction corresponding to the feed of cartridge clips $D_3$, $D_4$, etc., toward their firing position.

The pistons slidable in cylinder 47 are moved by means of a cam 53 driven by one end of hollow shaft 14 (which carries toothed wheels 13), said cam 53 preferably acting upon rod 54 through a roller 54.

I provide, on either side of the rows of driving pawls above described, two rows of pawls 55 mounted directly on the corresponding walls of magazine 4, said last mentioned pawls being arranged in such manner as to prevent any recoil movement of the cartridge clips contained in magazine 4 when said clips occupy in the said magazine their firing or their waiting position.

The shape of cam 53 is determined in view of several factors and in particular of the number of teeth of wheels 13 and of the number of cartridges included in every clip, these numbers themselves determining the number (which must be an integer) of clips fired for a full revolution of the cam, and therefore for a full revolution of the rotor if the cam turns together with said rotor.

In particular if, in this last mentioned case, wheels 13 include ten teeth and if every clip includes five cartridges, a full revolution of the rotor will correspond to the firing of two cartridge clips and cam 53 will include two identical projections at 180° to each other, each serving to tension springs 48 and 52 then, once said springs have been placed under tension, to release rod 45 (and also rod 50 disposed in line with said rod 43) at the latest when the last cartridge of the clip that is being fired is stripped therefrom.

Thus I provide, for every projection of cam 53, a curved portion $r$ (see Fig. 7) followed by a substantially radial line $d$ intended to release the parts previously pushed back by inclined line $r$.

On Figs. 7 to 11, I have diagrammatically shown the most characteristic successive steps of the operation of such a system. On these figures, it is supposed that the noses of the pawls cooperate with the upper edges of the cartridge clips. It will be seen later on that, for practical purposes, it is preferable to provide on the front and rear faces of the clips special notches for cooperating with the pawls.

Fig. 7 corresponds to the time where cartridge clip $D_1$ is being fired and cartridge clips $D_2$, $D_3$, etc., constitute a stack resting upon said clip $D_1$. Roller 54 is close to the top of one of the portions $r$ of cam 53; springs 48 and 52 are compressed and the sets of pawls 41 and 42 are bearing upon the corresponding portions of clips $D_2$, $D_3$, etc., said pawls being ready to come into action to move said clips toward the bottom of magazine 4.

Fig. 8 shows the same parts after the plate of cartridge clip $D_1$ has been ejected. Roller 54 has moved past the portion $d$ of cam 53 and spring 48 (which has only to overcome the inertia of the moving elements it controls and that of cartridge clip $D_2$) has suddenly expanded, driving sliding members 40, pawls 41 and cartridge clip $D_2$. Spring 52 (which is to overcome the inertia of all the other cartridge clips $D_3$, $D_4$, etc.) is beginning to expand, thus starting the movement of said clips $D_3$, $D_4$, etc., toward clip $D_2$ which has already moved at a quicker speed than the other cartridge clips.

Fig. 9 corresponds to the time where spring 52 is reaching the end of its expansion, clips $D_3$, $D_4$, etc., having then been moved forward and constituting a stack which bears upon the cartridge clip $D_2$ which is already being fired. From ths tme on, all the fixed pawls 55 occupy a position for which they prevent rearward movement of the clips that have already moved past them respectively.

It should be noted that, from the time roller 54 has moved past line $d$ to the time clips $D_3$, $D_4$, etc., have finished their downward movement, roller 54 must move upon a neutral portion of cam 53 (in the form of a circular arc $c$), said neutral portion separating the portions $d$ and $r$ of said cam.

Fig. 10 corresponds to the time at which the second projection of cam 53 starts acting through its portion $r$ so as again to compress springs 48 and 52 and thus to bring the driving pawls toward the initial position from which they are ready to act upon clips $D_3$, $D_4$, etc., which must move down as soon as the plate of the cartridge clip $D_2$ that is being fired is ejected.

Fig. 11 shows the parts when they are coming back to respective positions illustrated by Fig. 7. The situation is then identical to that of Fig. 7, with the difference that it is now the second projection of cam 53 which is in operation, said cam having rotated through half a revolution.

It will be readily understood that such a system for actuating the cartridge clips through the magazine makes it possible to substitute nearly instantaneously a fresh cartridge clip $D_2$ for the cartridge clip $D_1$ which has just been fired. On the other hand, the other cartridge clips in the magazine are gradually moved toward firing position, this movement taking place at a slower rate since it may be done most during the whole time necessary for the firing of a cartridge clip, that is to say within a period which is five times longer than that necessary for substituting cartridge clip $D_2$ for cartridge clip $D_1$.

In the preceding description it has been supposed, for the sake of clarity, that cam 53 acts directly upon the roller 54 mounted at the end of guiding rod 45.

Figure 12:
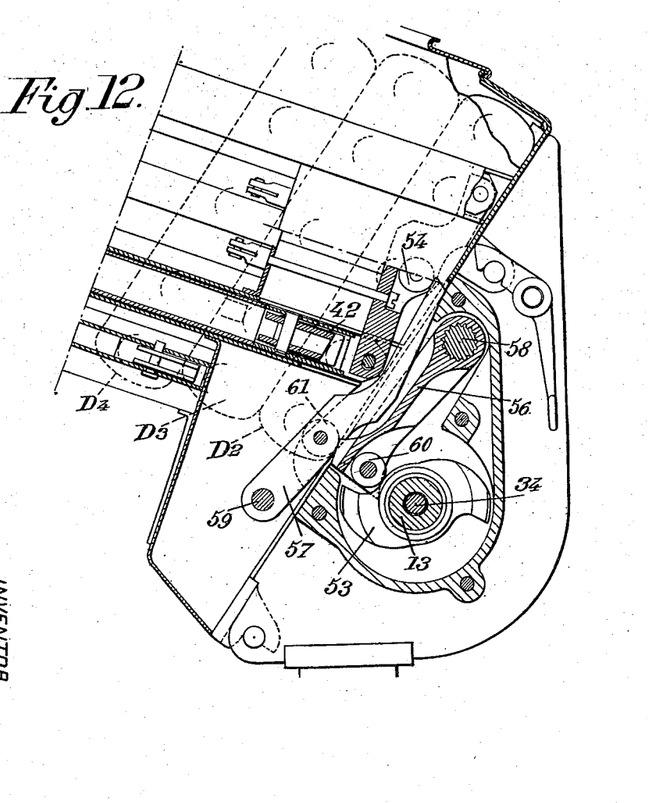
Fig. 12 is a cross sectional view on the line XII—XII of Fig. 2.

For practical purposes it seems preferable, as shown by Fig. 12, to interpose, between cam 53 and roller 54, a multiplication device which may be constituted, for instance, by a system of two levers 56 and 57 mounted respectively on spindles 58 and 59, said levers cooperating with each other and with cam 53 through rollers 60 and 61.

In the above description I have referred exclusively to the rows of pawls located on one of the walls of magazine 4, but of course it will suffice, for controlling the rows of pawls corresponding to the opposite wall of said magazine, to duplicate the elements above described. However it is possible to make use of a single cam 53 acting upon lever 56 to actuate simultaneously not only this lever but also a second lever 56 disposed on the other side of the mechanism and connected with the first lever 56 by spindle 58, each of these levers 56 acting respectively upon a lever 57.

Figure 13:
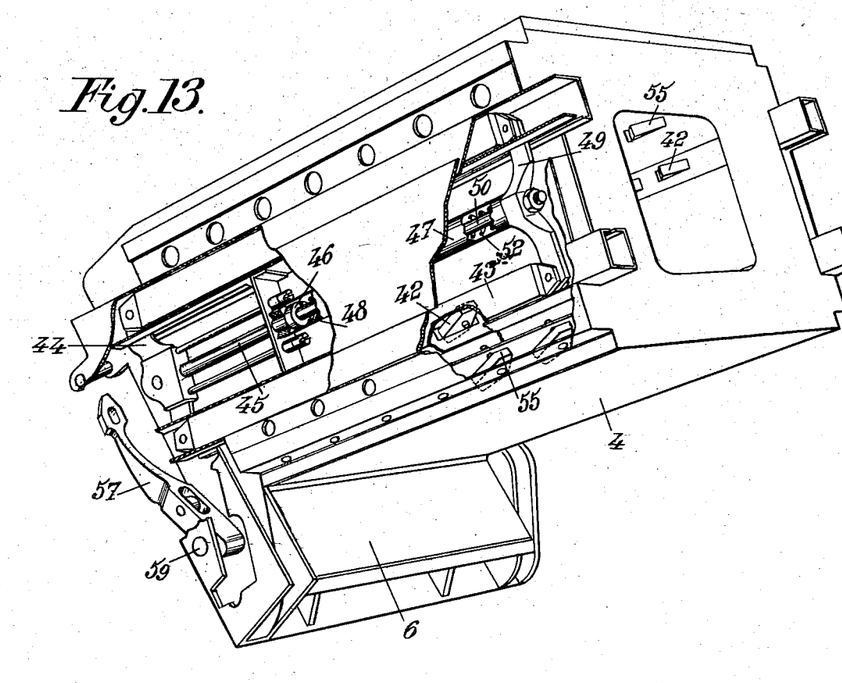
Fig. 13 is a perspective view, with parts cut away, of the magazine as visible from the outside.

Fig. 13 shows magazine 4 in perspective view with parts cut away so as to show the general arrangement of the elements of the system for moving the cartridge clips through said magazine.

Figures 14, 15:
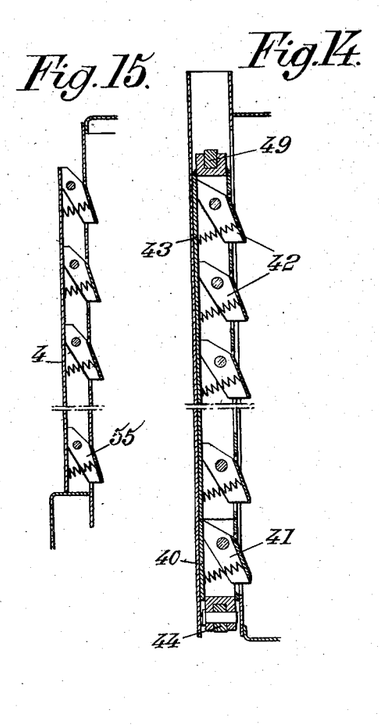
Figs. 14 and 15 are side views of rows of pawls mounted on the walls of said magazine.

Figs. 14 and 15 are side views showing, on the one hand, driving pawls 41 and 42 and also sliding members 40 and 43 which support said pawls respectively and, on the other hand, fixed pawls 35, which are directly pivoted on the wall of magazine 4.

In the construction above described the cartridges, after they have been stripped from the plates of the cartridge clips, must move, after they have left toothed wheels 13, along a path which leads them to feed passage 37. When the mechanism is for the feed of a gun in which the first cartridge to be introduced must bear directly upon the breech-casing, I may make use of a slightly different construction according to which the cartridges that are extracted from the cartridge clip that is being fired are fed directly into introduction position by the combined action of wheels 13 and deflectors 36.

Such a construction is diagrammatically illustrated by Fig. 16.

In this case, the rotor which carries wheels 13 is mounted above the orifice through which the cartridges are introduced into the gun.

I provide, to cooperate with the first cartridge to come into introduction position, deflectors 62 (urged by springs 63) arranged in such manner as to move said cartridge away from toothed wheels 13 when it comes above the introduction orifice and to give it a slight frontward swinging movement, whereby it instantaneously occupies a correct position on the supporting edges in contact with which it must remain until the breech-block introduces it into the gun.

It has been supposed in this second construction, merely by way of example, that toothed wheels 13 have a number of teeth equal to the number of cartridges contained in every cartridge clip, whereby cam 53 has a single portion $r$ and a single portion $d$ connected together by a neutral portion $c$.

It is advantageous to complete the pawl mechanism that has just been described by a regulating device which makes it possible to spread upon a full cycle of operation the work that must be supplied by shaft 14 to actuate said pawls through cam 53.

Preferably, such a regulating device is made in the form of a resilient energy accumulator capable first of storing up energy supplied by the rotor at a time where cam 53 is inactive, and then to give back this energy to the rotor during the active period of said cam.

Figure 17:
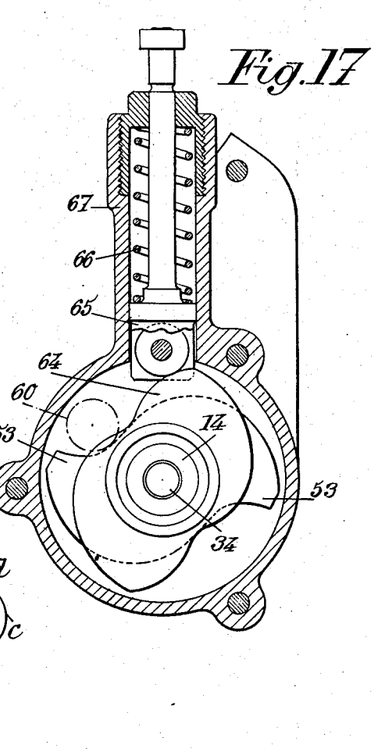
Figs. 17 and 18 are respectively a cross section and a longitudinal section of a regulating device for use in connection with my feeding mechanism.
Figure 18:
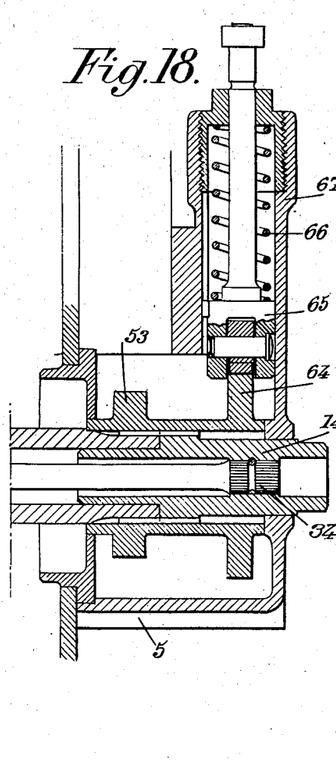

I may for instances make use for this purpose of the construction illustrated by Figs. 17 and 18.

In this construction I fix on the shaft 14 of the rotor a supplementary cam 64. This cam cooperates with a push-piece 65 capable, when pushed back by said cam 64, of compressing a spring 66 housed in a guiding sleeve 67 rigid with casing 5.

Cam 64 is so shaped, in relation to the shape of cam 53, that the active portions of said cam 64 are between the active portions of said cam 53, whereby the two above mentioned cams work alternately, cam 53 in order to compress springs of the pawl mechanisms, and cam 64 to store up in spring 66 energy collected from the rotor and to give it back to said rotor in the course of the working periods of cam 53.

Thus, it will be possible, by suitably calculating the shape of cam 64, to store up and to give back energy in such manner that the torque supplied by shaft 14 remains substantially constant during one cycle, the constant value of said torque being then of course lower than the maximum value of the torque which would have to be supplied by shaft 14 if the regulating device did not exist. Experience taught that the adjunction of said regulating device makes it possible to reduce by about 30% the torsional stress to which shaft 14 is subjected.

I will now further describe the arrangement of the cartridge clips.

Figure 19:
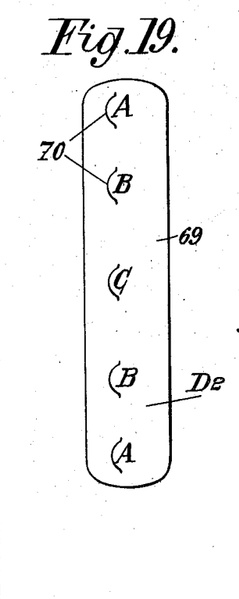
Figs. 19 and 20 are respectively an end view and a perspective view, with parts cut away, of a cartridge clip according to my invention.
Figure 20:
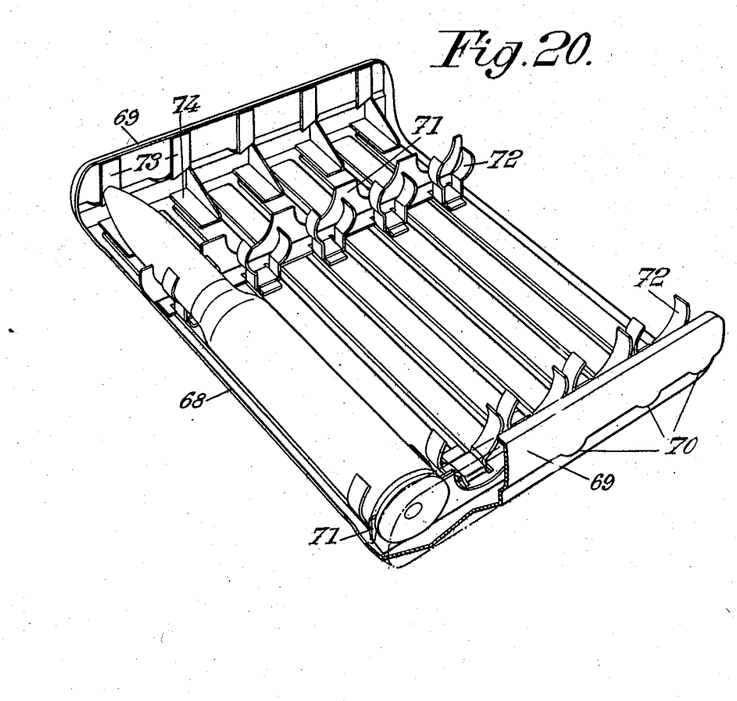

For this purpose I will refer to Figs. 19 and 20 which show a cartridge clip, respectively in end view and in perspective view with four out of the five cartridges thereof removed from said clip.

Every clip includes a plate 68 on which the cartridges are disposed side by side and held in a manner which will be more explicitly indicated hereinafter, said plate 68 including, on the edges thereof located opposite the ends of the cartridges, two stiffening flanges 69 at right angles to said plate.

Thus the whole is contained inside a parallelepipedon three of the faces of which are constituted by walls 68 and 69 and three other faces of which correspond to no material parts. Of course, when the clips are stacked upon one another in magazine 4, the free faces are turned downwardly whereby when the clips reach their firing position, toothed wheels 13 can come into engagement with the cartridges.

I may then constitute by mere notches 70 provided in flanges 69 the elements with which the rows of driving and holding pawls must cooperate. I then provide, near each end of each of flanges 69, two notches 70 intended to cooperate, one A (Fig. 19) with holding pawls 55, the other B with driving pawls 41 or 42.

Advantageously, I further provide in the middle portion of every flange 69 a supplementary notch C intended to cooperate with a lateral guiding element carried by magazine 4, said guiding element being arranged in such manner as to bear against notch C once the corresponding cartridge clip has reached its firing position at the bottom of the magazine. In this way, the guiding of this clip during its movement along passage 6 will be improved.

Advantageously, the cartridges are fixed on plate 68 by making use of at least one and preferably two rigid rack-like members 71 capable of maintaining the desired interval between adjacent cartridges. Furthermore, two rows of spring strips such as 72 are arranged so as resiliently to surround the cartridges placed in said rack-like rows.

For instance, the two rigid rack-like members 71 may be disposed respectively opposite the middle of the shell and the groove serving to the extraction of the cartridge case, whereas resilient strips 72 are disposed between these two rack-like members and in the vicinity of each of them respectively.

This double fixation, both by rigid rack-like members and by resilent strips, is particularly advantageous in the case of a feed mechanism such as that above described, since the rigid rack-like members 71 transmit to the body of the clip the translatory effort imparted to the cartridges by toothed wheels 13. On the other hand, strips 72 hold the cartridges only resiliently in the direction at right angles to plate 68, whereby the stripping of said cartridges by deflectors 36 can take place without difficulty.

Advantageously, the plate of every clip is provided with guiding surfaces located opposite the points of the shells of said cartridges and they are arranged so as to prevent, during the stripping of the cartridges from strips 72, axial displacements of said cartridges the amplitude of which might disturb said stripping operation.

I might make use of a plane and continuous guiding surface opposite the points of the shells, but it seems preferable to make use of the arrangement illustrated by Fig. 20 and according to which there is provided, opposite every shell point, a guiding wall 73, for instance at right angles to the plane of plate 68 and extending as far as the edge of the corresponding flange 69, every wall portion 73 being fixed on plate 68, for instance through a bracket 74.

Flanges 69 can then have a bent edge, which improves their rigidity, without any risk of the shell points being caught by said edge during the cartridge stripping operation.

Finally, in order to avoid jamming in magazine 4 and to facilitate the downward movement of the first cartridge clip which is to come into firing position, it is of interest to give flanges 69 a bulging shape toward the outside (to eliminate risks of jamming) and to give the ends of said flanges a rounded shape (in order to facilitate the downward movement of the clip).

I will now describe the operation of the feeding mechanism according to my invention, it being supposed that every cartridge clip includes five cartridges, that the rotor wheels have ten teeth and that the angular plays to be referred to correspond to numerical values of 30° and 12°.

Figure 21:
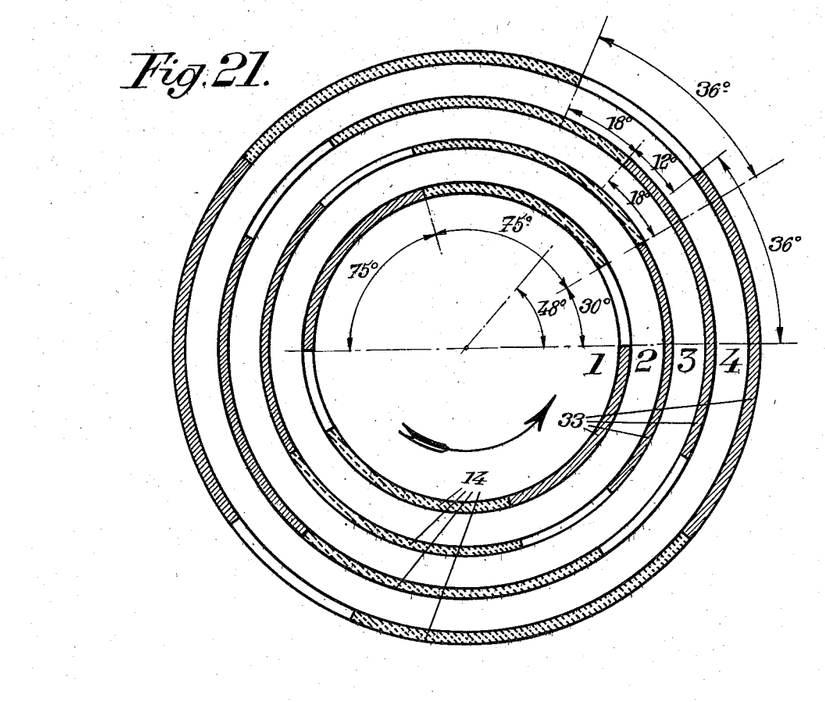
Fig. 21 is an explanatory diagram.

In the following description, reference will be made particularly to Fig. 21 which is a diagram showing, at four times during the operation of the mechanism, the angular positions of the clutch teeth 35 carried respectively by shaft 14 (shown cross-hatched in solid lines) and by hollow shaft 33 (shown cross-hatched in dotted lines).

Initially, the breech-block being in barrel closing position, cam 53 and also the rotor are brought, by means of a spanner engaged on the nut-like end 12 of shaft 14, in a well determined position (corresponding to the neutral portion of cam 53). A first cartridge clip $D_1$ is then introduced into the magazine and pushed downwardly. The first cartridge of this clip is engaged in one of the recesses of the rotor wheels 13. By means of the spanner, the rotor wheels 13 and cam 53, which is rigid therewith, are sufficiently rotated (through about 3 pitches and ⅔ of a pitch) to extract cartridges therefrom so that the first one comes to rest upon the breech-casing of the gun, which causes the cartridge clip $D_1$ to be moved forward a distance corresponding to 3 pitches and ⅔ of a pitch laterally in outlet passage 6. Springs 48 and 52 are simultaneously compressed.

The breech is opened and the rotor wheels are further rotated, by means of the same spanner, through ⅓ of a pitch so as to bring the first cartridge onto edges 37a of passage 37 without being pressed downwardly by the other cartridges.

The magazine is then further charged with cartridge clips $D_2$, $D_3$, $D_4$, $D_5$ stacked upon one another and which, once they have been inserted, are held by pawls 55. Springs 48 and 52 are compressed but, due to the position of cam 53, pawls 41 and 42 exert no downward thrust upon the cartridge clips.

When the breech-block is released, it catches the cartridge which is resting in waiting position on edges 37a and introduces it onto the cartridge chamber, the rotor wheels 13 remaining stationary. At this time, the next cartridge comes to rest on the back of the breech-block, but it is not pressed thereon because the rotor wheels 13 have not been moved any more. In order to come to press down on the cartridge resting on the back of the breech-block, it will now be necessary for the rotor unit to rotate through ⅔ of a pitch (24°).

As soon as the shot is fired, the whole of the gun recoils and cam 15, pushed between rollers 18 and 20, causes shaft 33 to move through 48° (1 pitch and ⅓ of a pitch). On Fig. 21, this corresponds to shaft 33 passing from position 1 first to position 2, then to position 3. This displacement of 48° will be reduced to 36° (one pitch) when, later on, the gun returning to its initial position, cam 15, moving back from between rollers 18 and 20, permits a backward movement of 12° of part 33, i. e. such that of the teeth 28 of the driven portion 27 of the free wheel is stopped by pawl 29. On Fig. 21, shaft 33 passes to position 4. As part 33 is connected through torsion bar 34 with shaft 14 which carries rotor wheels 13 and cam 53, the movement of rotation of part 33 causes said shaft 14 to rotate through ⅔ of a pitch (after which, as above stated, wheels 13 are stopped by the cartridges) and bar 34 to be twisted through an angle of ⅔ of a pitch. If necessary, teeth 35 cooperate together to overcome any resistance.

Simultaneously with rotor wheels 13, cam 53 has rotated through ⅔ of a pitch and after a short portion of this movement, roller 54 has come beyond the end of the portion $r$ of said cam. But, as clip $D_1$ is still engaged under the other clips, roller 54 and rod 45 cannot move down under the action of spring 48.

The firing of the shot has produced a recoil of the breech-block with respect to the breech casing and, in the course of this recoil movement, the first cartridge resting on said breech-block with a gradually increasing pressure drops onto the edges 37a of passage 37 when the breech-block retracts from under said cartridge. This releases rotor unit 13 which can rotate further through an angle equal to ⅓ of a pitch under the action of torsion bar 34 which is thus partly untwisted but still remains twisted with an angle of ⅓ of a pitch so as to be able, a short time thereafter, to impart to part 33 the above mentioned backward rotation of 12° (⅓ of a pitch).

The last rotation of ⅓ of a pitch of shaft 14 has caused clip $D_1$ to move out from under clip $D_2$. Springs 48 and 52 are thus released and pawls 41 and 42 can act upon the remaining cartridge clips, this action taking place as follows.

Spring 48, acting upon the cartridge clip $D_2$, pushes it very quickly against the bottom of the magazine so that it is placed immediately next to the cartridge clip $D_1$ which is being ejected, and that its first cartridge comes into engagement with the first free recess in the rotor wheels 30. From this time, on cartridge clip $D_2$ is kept in position by the corresponding fixed pawls 55.

As for the spring 52 which is acting upon the next cartridge clips $D_3$, $D_4$, etc., it expands less rapidly, whereby, when cartridge clip $D_2$ is already in position, cartridge clips $D_3$, $D_4$, etc., are still moving toward their new positions (as shown by Fig. 8).

When the next shot is fired, cam 53 rotates through an angle equal to one pitch but, due to the existence of neutral zone $c$, roller 54 is not pushed back (Fig. 8). Thus, spring 52 has sufficient time to finish its movement and to bring clips $D_3$, $D_4$, etc., into position under their respective holding pawls 55.

Cam 53, during the firing of the next shots, is again displaced step by step (Figs. 9, 10 and 11) and in the course of its displacement, it gradually compresses springs 48 and 52 until a downward movement of the cartridge clips (on every cycle of five shots) again takes place.

The other phases of the operation (in particular concerning the operation of fixed deflectors 36, and also of movable deflectors 38 and 38a and also of the energy accumulator shown by Figs. 17 and 18) are believed to result sufficiently clearly from the preceding description to make further explanations unnecessary. The advantages of the mechanism also result from the preceding description.

With a system as above described, when all the cartridge clips in the magazine have been spent, with the exception of one remaining partly engaged in discharge passage 6, it may happen that the first fresh cartridge clip which is then introduced to fill up the magazine, violently strikes the partly ejected clip, and some of the cartridges of said fresh clip are torn away therefrom by said shock.

It may also happen that this fresh clip assumes an oblique position because one end thereof is stopped by the partly ejected remaining clip.

In order to avoid these, and other possible, incidents, it is preferable to make use of a device as shown by Fig. 2 bis. This device includes, rigid with one of the rotor wheels 13, a cam 75 cooperating with a cam follower constituted by a roller 76a journalled at the end of a lever 76 pivoted on a transverse spindle 78. The hub of said lever carries a projection 79. The wall 80 of the magazine casing carries, fixed thereto, a bearing 81 in which is journalled a lever 83, acted upon by projection 79. The end 83a of lever 83 forms a retractable support for the cartridges of the clips introduced into the magazine.

This device works as follows:

In the position of Fig. 8, the space under clip $D_2$ is left unobstructed because lever 83 is in retracted position, i. e. it is not lifted by projection 79. When this clip $D_2$ moves outwardly through the positions of Figs. 9 and 10, lever 83 still remains retracted, because roller 76a is located on one of the portions 75a of cam 76.

When clip $D_2$ comes into the position of Fig. 11, lever 76 is lifted by one of the portions 75b of cam 75, and projection 79 moves lever 83 upwardly, whereby the flat end 83a of this lever comes into the magazine, in a position where it supports one end of the next clip $D_3$ and prevents it from assuming an oblique position. Furthermore, this end 83a of lever 83 prevents cartridges held in said clip $D_3$ from being extracted by inertia therefrom.

Under the effect of cam 75, transmitted by lever 76 and projection 79, lever 83 is allowed to swing down into retracted position when clip $D_2$ is ejected and clip $D_3$ is to move down to the bottom of the magazine.

What I claim is:

1. An automatic gun which comprises, in combination, a support, a gun slidable longitudinally in said support for recoil and anti-recoil displacement, a magazine fixed to said support having an inlet end and a discharge end a multiplicity of juxtaposed cartridge clips movably guided in said magazine, each of said clips consisting of a holder-plate transverse to its direction of movement in said magazine and a row of cartridges each detachably held by said plate, said cartridges being substantially parallel to the line of fire of said gun, discharge means carried by said magazine for guiding every cartridge clip, as it has reached said discharge end, in a direction parallel to its own plane and substantially at right angles to said gun, a mechanism carried by said magazine discharge end for stripping from the holder plate of every clip in said discharge guiding means the cartridges thereof successively and feeding them to said gun, while simultaneously propelling said holder plate outwardly through said discharge guiding means, means movably guided in said magazine for driving said cartridge clips from said inlet end of said magazine to said discharge end thereof, actuating means carried by said magazine consisting of a piece movable with respect to said magazine, resilient means for transmitting to said clip driving means the energy supplied by the movement of said piece with respect to said magazine, and means interposed between said gun and said piece for moving said piece with respect to said magazine in response to recoil displacement of said gun with respect to said magazine.

2. An automatic gun according to claim 1 further including retractable holding means carried by said magazine to prevent backward movement of the cartridge clips travelling therethrough.

3. A gun according to claim 1 in which said magazine is off-set laterally and disposed obliquely to the vertical, the holder plates of said clips being nearly horizontal.

4. An automatic gun which comprises, in combination, a support, a gun slidable longitudinally in said support for recoil and anti-recoil displacement, a magazine fixed to said support having an inlet end and a discharge end, a multiplicity of juxtaposed cartridge clips guided in said magazine for movement from said inlet end to said discharge end where the respective clips successively occupy an active position where they can begin to supply their cartridges to said gun, each of said clips consisting of a holder-plate transverse to its direction of movement in said magazine and a row of cartridges each detachably held by said plate, said cartridges being substantially parallel to the line of fire of said gun, a discharge passage carried by said magazine for guiding every cartridge clip, as it has reached its active position, in a direction parallel to its own plane and substantially at right angles to said gun, a mechanism carried by said magazine discharge end for stripping from the holder plate of every clip having reached said active position the cartridges thereof successively and feeding them to said gun, while simultaneously propelling said holder plate outwardly through said discharge passage, means movably guided in said magazine for driving said cartridge clips from said inlet end of said magazine to said discharge end thereof, said clip driving means including a quick acting portion for immediately bringing into active position the clip following that engaged in said discharge passage as soon as the last mentioned one is emptied, and a slower acting portion for moving the whole of the other clips toward said active position during the time the clip thus brought in active position is being stripped of its cartridges, actuating means carried by said magazine consisting of a piece movable with respect to said magazine, resilient means for transmitting to said clip driving means the energy supplied by the movement of said piece with respect to said magazine, and means interposed between said gun and said piece for moving said piece with respect to said magazine in response to recoil displacement of said gun with respect to said magazine.

5. A gun according to claim 4 further characterized in that each of said portions of said driving means includes at least one sliding part reciprocable in said magazine in the direction of travel of said clips and at least one pawl carried by said part.

6. A gun according to claim 4 further characterized in that each of said portions of said driving means includes at least one sliding part reciprocable in said magazine in the direction of travel of said clips and at least one pawl carried by said part, said driving means further including a common member, connected with said resilient means for operating the respective sliding parts of said two portions of said driving means.

7. A gun according to claim 4 further characterized in that each of said portions of said driving means includes at least one sliding part reciprocable in said magazine in the direction of travel of said clips and at least one pawl carried by said part, said driving means further including a common member, connected with said resilient means for operating the respective sliding parts of said two portions of said driving means, and elastic means interposed between said common member and each of said sliding parts respectively.

8. An automatic gun which comprises, in combination, a support, a gun slidable longitudinally in said support for recoil and anti-recoil displacement, a magazine fixed to said support having an inlet end and a discharge end, a multiplicity of juxtaposed cartridge clips movably guided in said magazine, each of said clips consisting of a holder-plate transverse to its direction of movement in said magazine and a row of cartridges each detachably held by said plate, said cartridges being substantially parallel to the line of fire of said gun, discharge means carried by said magazine for guiding every cartridge clip, as it has reached said discharge end, in a direction parallel to its own plane and substantially at right angles to said gun, and a mechanism carried by said magazine discharge end for stripping from the holder plate of every clip in said discharge guiding means the cartridges thereof successively and feeding them to said gun, while simultaneously propelling said holder plate outwardly through said discharge guiding means, said mechanism being of the rotor type and including a plurality of toothed wheels engaging the cartridges of said clip located in said discharge means, means operative by the recoil energy of said gun for driving said rotor wheels, reciprocating means movably guided in said magazine for positively driving said cartridge clips step by step from said inlet end of said magazine to said discharge end thereof, actuating means carried by said magazine consisting of a piece movable with respect to said magazine, resilient means for transmitting to said clip driving means the energy supplied by the movement of said piece with respect to said magazine, and means interposed between said gun and said part for moving said piece with respect to said magazine in response to recoil displacement of said gun with respect to said magazine.

9. A gun according to claim 8 in which said stripping means include arcuate deflectors fixed to said magazine and located tangentially to the holder plate of the cartridge clip that is moving in said discharge means so as to have their points engaged between said plate and the cartridges of said clip.

10. A gun according to claim 8 in which said stripping means include arcuate deflectors fixed to said magazine and located tangentially to the holder plate of the cartridge clip that is moving in said discharge means so as to have their points engaged between said plate and the cartridges of said clip, said means for feeding the cartridges to the gun including yielding deflectors pivoted to said magazine and located across the path of travel of the cartridges propelled by said rotor toothed wheels, spring means for resiliently opposing the thrust of said cartridges on said pivoting deflectors, abutments for limiting the yielding displacements of said pivoting deflectors, and at least one other pivoting deflector disposed similarly to the first mentioned one but rearwardly thereof, having a non-limited displacement, and spring means stronger than the above mentioned spring means for resiliently opposing the thrust of said cartridges on said last mentioned deflector.

11. A gun according to claim 8 including, on the holder plate of every cartridge clip, at least one fixed rack-like member to keep the cartridges at suitable distances from one another and spring strips for holding said cartridges.

12. A gun according to claim 8 including, rigid with the holder plate of every cartridge clip, flanges transverse to said plate and extending along the edges thereof close to the points and the bases of the cartridges carried by said plate.

13. A gun according to claim 8 including, on the holder plate of every cartridge clip, parts having surfaces for guiding the points of the cartridges when they are stripped from said plate.

14. A gun according to claim 8 in which said magazine is off-set laterally and disposed obliquely to the vertical, the holder plates of said clips being nearby horizontal.

15. An automatic gun which comprises, in combination, a support, a gun slidable longitudinally in said support for recoil and anti-recoil displacement, a magazine fixed to said support having an inlet end and a discharge end, a multiplicity of juxtaposed cartridge clips guided in said magazine for movement from said inlet end to said discharge end where the respective clips successively occupy an active position where they can begin to supply their cartridges to said gun, each of said clips consisting of a holder-plate transverse to its direction of movement in said magazine and a row of cartridges each detachably held by said plate, said cartridges being substantially parallel to the line of fire of said gun, a discharge passage carried by said magazine for guiding every cartridge clip, as it has reached its active position, in a direction parallel to its own plane and substantially at right angles to said gun, a mechanism carried by said magazine discharge end for stripping from the holder plate of every clip having reached said active position the cartridges thereof successively and feeding them to said gun, while simultaneously propelling said holder plate outwardly through said discharge passage, said mechanism being of the rotor type and including a plurality of toothed wheels engaging the cartridges of said clip located in said discharge means, means operative by the recoil energy of said gun for driving said rotor wheels, means movably guided in said magazine for driving said cartridge clips from said inlet end of said magazine to said discharge end thereof, said clip driving means including a quick acting portion for immediately bringing into active position the cartridge clip that follows the one engaged in said discharge passage as soon as the latter is emptied and a slower acting portion for moving the whole of the other clips toward said active position during the time the clip thus brought in active position is being stripped of its cartridges, each of the portions of said driving means including at least one sliding part reciprocable in said magazine in the direction of travel of said clips and at least one pawl carried by said part, a shaft journalled in said magazine, resilient means for transmitting the rotation movement of said shaft to said rotor mechanism, means interposed between said gun and said shaft for rotating said shaft in said magazine in response to recoil displacement of said gun with respect to said magazine, and a cam rotatable together with said rotor mechanism operatively connected with said parts of said driving mechanism.

References Cited in the file of this patent
UNITED STATES PATENTS

| | | |
|---|---|---|
| 924,732 | Carey | June 15, 1909 |
| 1,342,358 | Storle | June 1, 1920 |
| 1,504,393 | Sutton | Aug. 12, 1924 |
| 1,709,399 | Herlach | Apr. 16, 1929 |

UNITED STATES PATENT OFFICE

CERTIFICATE OF CORRECTION

Patent No. 2,830,498 April 15, 1958

Bernard Maillard

It is hereby certified that error appears in the above numbered patent requiring correction and that the said Letters Patent should read as corrected below.

In the heading to the printed specification, between lines 10 and 11, insert the following:

-- Claims priority, application Luxemburg October 30, 1953 --

Signed and sealed this 7th day of October 1958.

(SEAL)
Attest:
KARL H. AXLINE

Attesting Officer

ROBERT C. WATSON
Commissioner of Patents